(12) United States Patent
Kasriel

(10) Patent No.: US 7,631,035 B2
(45) Date of Patent: Dec. 8, 2009

(54) PATH-ANALYSIS TOOLBAR

(75) Inventor: Stephane Kasriel, San Francisco, CA (US)

(73) Assignee: Digital River, Inc., Eden Prairie, MN (US)

( * ) Notice: Subject to any disclaimer, the term of this patent is extended or adjusted under 35 U.S.C. 154(b) by 137 days.

(21) Appl. No.: 10/128,596

(22) Filed: Apr. 22, 2002

(65) Prior Publication Data

US 2003/0128233 A1    Jul. 10, 2003

Related U.S. Application Data

(60) Provisional application No. 60/347,390, filed on Jan. 9, 2002.

(51) Int. Cl.
*G06F 15/16* (2006.01)
(52) U.S. Cl. .................. 709/203; 709/217; 709/223; 709/224
(58) Field of Classification Search ........... 709/203, 709/217, 219, 223–224
See application file for complete search history.

(56) References Cited

U.S. PATENT DOCUMENTS

| | | | |
|---|---|---|---|
| 5,668,988 A * | 9/1997 | Chen et al. | ............... 707/101 |
| 5,717,860 A | 2/1998 | Graber et al. | |
| 5,778,381 A | 7/1998 | Sandifer | |
| 5,806,077 A | 9/1998 | Wecker | |
| 5,870,559 A | 2/1999 | Leshem et al. | |
| 5,892,917 A * | 4/1999 | Myerson | ................ 709/224 |
| 5,913,033 A | 6/1999 | Grout | |
| 5,933,830 A | 8/1999 | Williams | |

(Continued)

FOREIGN PATENT DOCUMENTS

EP    0860786 A2    8/1998

OTHER PUBLICATIONS

World Reporter, "MyComputer.com Adds Powerful Site-Path Analysis Functionality to SuperStats; News Reports Provide IN-Depth Detail of Web Site Visitor Patterns," Apr. 27, 2000, Business Wire WBWE.*

(Continued)

*Primary Examiner*—LaShonda T Jacobs
(74) *Attorney, Agent, or Firm*—North Oaks Patent Agency; Shawn B. Dempster

(57) ABSTRACT

A toolbar is provided that is synchronized with a web-site browser system. The toolbar provides an interface to a path analysis system that provides path analysis data related to a select web-page. By synchronizing the toolbar to the browser, the path analysis system provides path analysis data related to the web-page that the browser is currently displaying. By displaying the path analysis data coincident with the content of the web-page from the browser, the user is provided a direct visual association between the actual web-page and the traversals to and from the web-page. By synchronizing the toolbar with the browser, the user can view the path analysis data of each page as the user navigates through the web-site using the same technology that a typical web-site visitor would use. The toolbar in a preferred embodiment is also configured to be synchronized to the movements of a cursor within the browser, and to highlight the path analysis data associated with each link as the cursor is brought in proximity to the link on the displayed web-page.

37 Claims, 3 Drawing Sheets

U.S. PATENT DOCUMENTS

| | | | |
|---|---|---|---|
| 5,999,929 A | 12/1999 | Goodman | |
| 6,018,619 A | 1/2000 | Allard et al. | |
| 6,072,486 A | 6/2000 | Sheldon et al. | |
| 6,088,707 A | 7/2000 | Bates et al. | |
| 6,092,074 A | 7/2000 | Rodkin et al. | |
| 6,112,238 A * | 8/2000 | Boyd et al. | 709/224 |
| 6,182,097 B1 | 1/2001 | Hansen et al. | |
| 6,199,098 B1 | 3/2001 | Jones et al. | |
| 6,278,966 B1 * | 8/2001 | Howard et al. | 703/23 |
| 6,304,904 B1 | 10/2001 | Sathyanarayan et al. | |
| 6,308,210 B1 * | 10/2001 | Fields et al. | 709/224 |
| 6,308,212 B1 | 10/2001 | Besaw et al. | |
| 6,330,596 B1 | 12/2001 | Stuckman et al. | |
| 6,341,310 B1 * | 1/2002 | Leshem et al. | 709/223 |
| 6,353,446 B1 | 3/2002 | Vaughn et al. | |
| 6,393,479 B1 * | 5/2002 | Glommen et al. | 709/224 |
| 6,396,810 B1 * | 5/2002 | Hebel | 370/248 |
| 6,426,759 B1 | 7/2002 | Ting et al. | |
| 6,427,175 B1 | 7/2002 | Khan et al. | |
| 6,442,615 B1 | 8/2002 | Nordenstam et al. | |
| 6,449,604 B1 * | 9/2002 | Hansen et al. | 707/1 |
| 6,449,739 B1 | 9/2002 | Landan | |
| 6,460,038 B1 | 10/2002 | Khan et al. | |
| 6,466,970 B1 * | 10/2002 | Lee et al. | 709/217 |
| 6,487,555 B1 | 11/2002 | Bharat et al. | |
| 6,567,852 B2 | 5/2003 | Besaw et al. | |
| 6,572,662 B2 | 6/2003 | Manohar et al. | |
| 6,591,298 B1 | 7/2003 | Spicer et al. | |
| 6,597,377 B1 * | 7/2003 | MacPhail | 715/738 |
| 6,633,316 B1 | 10/2003 | Maddalozzo et al. | |
| 6,642,946 B1 | 11/2003 | Janes et al. | |
| 6,661,431 B1 | 12/2003 | Stuart et al. | |
| 6,682,548 B2 | 1/2004 | Lang et al. | |
| 6,691,163 B1 | 2/2004 | Tufts | |
| 6,697,969 B1 | 2/2004 | Merriam | |
| 6,732,088 B1 | 5/2004 | Glance | |
| 6,735,604 B2 | 5/2004 | Miller et al. | |
| 6,745,227 B1 | 6/2004 | Bates et al. | |
| 6,747,762 B1 | 6/2004 | Josephsen et al. | |
| 6,763,362 B2 * | 7/2004 | McKeeth | 707/104.1 |
| 6,766,370 B2 * | 7/2004 | Glommen et al. | 709/224 |
| 6,772,139 B1 | 8/2004 | Smith | |
| 6,820,236 B1 | 11/2004 | Bates et al. | |
| 6,826,595 B1 | 11/2004 | Barbash et al. | |
| 6,834,372 B1 | 12/2004 | Becker et al. | |
| 6,859,212 B2 | 2/2005 | Kumar et al. | |
| 6,925,496 B1 * | 8/2005 | Ingram et al. | 709/224 |
| 6,941,512 B2 | 9/2005 | Cheng | |
| 6,963,874 B2 * | 11/2005 | Kasriel et al. | 707/10 |
| 6,981,037 B1 * | 12/2005 | Srikant et al. | 709/223 |
| 7,000,181 B2 | 2/2006 | Press | |
| 7,020,643 B2 * | 3/2006 | Mah et al. | 706/46 |
| 7,028,001 B1 * | 4/2006 | Muthuswamy et al. | 705/14 |
| 7,085,736 B2 | 8/2006 | Keezer et al. | |
| 7,089,237 B2 | 8/2006 | Turnbull et al. | |
| 7,107,548 B2 | 9/2006 | Shafron | |
| 7,143,365 B2 * | 11/2006 | Gallella | 715/851 |
| 7,441,195 B2 * | 10/2008 | Error et al. | 715/738 |
| 2001/0037359 A1 | 11/2001 | Mockett et al. | |
| 2002/0015060 A1 | 2/2002 | Honjas | |
| 2002/0019837 A1 | 2/2002 | Balnaves | |
| 2002/0046046 A1 | 4/2002 | Barrott et al. | |
| 2002/0052947 A1 | 5/2002 | Duimovich et al. | |
| 2002/0070963 A1 | 6/2002 | Odero et al. | |
| 2002/0087679 A1 | 7/2002 | Pulley et al. | |
| 2002/0091817 A1 | 7/2002 | Hill et al. | |
| 2002/0099816 A1 | 7/2002 | Quarterman et al. | |
| 2002/0116494 A1 | 8/2002 | Kocol | |
| 2002/0129114 A1 | 9/2002 | Sundaresan et al. | |
| 2002/0130907 A1 | 9/2002 | Chi et al. | |
| 2002/0138336 A1 | 9/2002 | Bakes et al. | |
| 2002/0143933 A1 | 10/2002 | Hind et al. | |
| 2002/0152242 A1 | 10/2002 | Meyer et al. | |
| 2002/0186237 A1 * | 12/2002 | Bradley et al. | 345/736 |
| 2003/0004853 A1 | 1/2003 | Ram et al. | |
| 2003/0023675 A1 | 1/2003 | Ouchi et al. | |
| 2003/0033403 A1 | 2/2003 | Rhodes | |
| 2003/0046383 A1 | 3/2003 | Lee et al. | |
| 2003/0069962 A1 | 4/2003 | Pandya | |
| 2003/0070139 A1 | 4/2003 | Marshall et al. | |
| 2003/0115333 A1 * | 6/2003 | Cohen et al. | 709/227 |
| 2003/0128231 A1 * | 7/2003 | Kasriel et al. | 345/736 |
| 2003/0130982 A1 * | 7/2003 | Kasriel et al. | 707/1 |
| 2003/0131097 A1 * | 7/2003 | Kasriel et al. | 709/224 |
| 2003/0131106 A1 * | 7/2003 | Kasriel | 709/225 |
| 2003/0144988 A1 | 7/2003 | Nareddy et al. | |
| 2003/0174154 A1 | 9/2003 | Yukie et al. | |
| 2003/0195960 A1 | 10/2003 | Merriam | |
| 2003/0196164 A1 | 10/2003 | Gupta et al. | |
| 2003/0202009 A1 * | 10/2003 | Kasriel | 345/739 |
| 2004/0138946 A1 | 7/2004 | Stolze | |
| 2004/0163042 A1 | 8/2004 | Altman | |
| 2004/0189713 A1 | 9/2004 | Thames et al. | |
| 2006/0020538 A1 | 1/2006 | Ram et al. | |
| 2006/0085734 A1 | 4/2006 | Balnaves | |
| 2006/0106681 A1 | 5/2006 | Shafron et al. | |
| 2006/0107217 A1 | 5/2006 | Lu et al. | |
| 2006/0218052 A1 | 9/2006 | Haynes et al. | |

OTHER PUBLICATIONS

Berkhin, Parvel et al, Interactive Path Analysis of Web Site Traffic, 2001, ACM Press, pp. 414-419.* iAnnotate-it™ 2 for Business [online]. Insight Development Corp., San Ramon, CA, publication date unknown [retrieved on Sep. 26, 2002]. Retrieved from the Internet: <URL: http://www.insightdev.com/products/nettool_bian.htm>.

U.S. Appl. No. 09/734,910, filed Dec. 11, 2000, Kasriel et al.
U.S. Appl. No. 10/079,932, filed Feb. 19, 2002, Kasriel.
U.S. Appl. No. 10/128,596, filed Apr. 22, 2002, Kasriel.
U.S. Appl. No. 10/128,595, filed Apr. 22, 2002, Kasriel.
U.S. Appl. No. 10/128,594, filed Apr. 22, 2002, Kasriel, et al.
U.S. Appl. No. 10/128,598, filed Apr. 22, 2002, Kasriel, et al.
U.S. Appl. No. 09/734,910, filed Dec. 11, 2000, Kasriel, et al.
Astra SiteManager, (n.d.)., www.visualcomplexity.com, Retrieved Jun. 12, 2009.

* cited by examiner

PATH-ANALYSIS TOOLBAR

RELATED APPLICATIONS

This application claims the benefit of U.S. Provisional Application No. 60/347,390, filed 9 Jan. 2002, entitled "Link Analysis".

This application is related to:

U.S. patent application Ser. No. 09/734,910, filed 11 Dec. 2000, entitled "Predictive Pre-download Using Normalized network Object Identifiers";

U.S. patent application Ser. No. 10/079,932, filed 19 Feb. 2002, entitled "Predictive Predownload of Templates with Delta Encoding";

U.S. patent application Ser. No. 10/128,597, filed 22 Apr. 2002, entitled "Dynamic Path Analysis"; and U.S. patent application Ser. No. 10/128,595, filed 22 Apr. 2002, entitled "Web-Page Performance Toolbar", all of which are incorporated by reference herein.

BACKGROUND OF THE INVENTION

1. Field of the Invention

This invention relates to the field of computer networks, and in particular to a system and method that facilitates an analysis of traffic patterns among sites on a network.

2. Description of Related Art

Path analysis, or traffic analysis, is a necessary tool for effective web-site management and on-going web-site development, as well as for the development of effective marketing strategies. Web-site managers, hereinafter webmasters, desire information that can be used to enhance the web-site's performance or appearance. Electronic-commerce marketing managers, hereinafter marketers, desire information that can be used to enhance the sales resulting from visits to a web-site, to enhance advertising revenue from the web-site, and/or to determine the effectiveness of advertising expenses to other web-site providers.

Tools are commonly available for collecting traffic data. A fundamental tool, for example, collects data regarding the number of times each page at a web site is accessed within a given period of time (e.g. 'hit-rate' statistics). A more sophisticated tool, such as the Netflame™ product from Fireclick, Inc., collects data regarding entries to and exits from each page at a web site. By tracking visitors' paths through the website, a Netflame™-enabled web-site can be configured to anticipate a next-page that a visitor is likely to visit, and can initiate a download of some or all of the anticipated next-page while the visitor is viewing the current page. In this manner, the performance of the web-site is significantly enhanced, because, from the visitor's perspective, the anticipated next-page appears to download instantaneously. Only if the visitor chooses an unanticipated next-page will the visitor experience the true download delay duration.

Copending U.S. patent application "PREDICTIVE PREDOWNLOAD USING NORMALIZED NETWORK OBJECT IDENTIFIERS", Ser. No. 09/734,910, filed 11 Dec. 2000 discloses a preferred technique for determining and downloading the anticipated next-page. Of particular note, this copending application also discloses the concept of a "normalized" web-page, wherein alternative versions of a web-page are analyzed and processed as a single web-page. That is, alternative versions of a web-page may include an element that varies, depending upon the environment, the particular viewer, the class of viewer, a currently advertised special, and so on. Each version may potentially correspond to a different web-page, because each version may have a different URL (Uniform Resource Locator). If processed and analyzed separately, the individual statistics that are associated with each of the different versions of a web-page would generally be meaningless. A normalized web-page comprises all of the non-varying elements of the alternative versions, and the data collected corresponding to each of the alternative versions is associated with the normalized web-page. In this manner, statistics are provided for the web-page, independent of variables associated with the web-page. For ease of reference and understanding, the term web-page as used herein includes a normalized web-page, and other collections of pages, files, and data that form a cohesive entity for traffic-analysis reporting purposes. For example, copending U.S. patent application "PREDICTIVE PREDOWNLOAD OF TEMPLATES WITH DELTA ENCODING, Ser. No. 10/079, 932, filed 19 Feb. 2002 discloses the use of "templates" that correspond to the relatively unchanging portions of a web-page, and "delta-encoding" to encode the portions of a web-page that change. As defined herein, the templates with multiple and varied delta-encodings correspond to a web-page. Other examples of collections of material forming a cohesive entity for traffic-analysis will be evident to one of ordinary skill in the art.

A marketable traffic-analysis product includes one or more tools for providing reports that are based on the collected traffic-pattern data. A web-page typically includes a number of links to other web-pages, and the choice of which links to include on a web-page can significantly affect the effectiveness of the web-page. From a marketing perspective, for example, the links should be structured to encourage a visitor to progress through the web-site to learn enough about the product or products being offered so as to encourage a purchase. A poorly designed web-page is often characterized by an abnormally high rate of exits from the web-site immediately after visiting the page, whereas a well-designed web-page is characterized by a high proportion of traversals to the appropriate next-page in the aforementioned desired progression through the web-site. By providing path analysis data related to traversals to and from each web-page, the effectiveness of existing web-pages, or the effectiveness of changes to existing web-pages, can be evaluated.

The information provided by path analysis tools is useful, but access to the information is somewhat cumbersome. Typically, a user types in or selects a URL corresponding to the web-page of interest, and the analysis tool presents the information corresponding to the selected or specified URL. The aforementioned Netflame™ product, presents a graph that displays interconnected pages of a web site, and allows a user to click on a node of the graph to display analysis information related to the selected page. Although this product allows a user to associate an 'alias' name to each web-page, to display more meaningful names in the report of traversals between web-pages, there is an inherent disassociation between a name of a web-page and the actual web-page. In like manner, there is an inherent disassociation between selecting a web-page by name, compared to actually navigating through the web-site to arrive at the different pages of the web-site.

BRIEF SUMMARY OF THE INVENTION

It is an object of this invention to provide a path analysis system that is consistent with common web-site navigation tools. It is another object of this invention to provide a path analysis system that provides for an immediate association between the contents of a web-page and the path analysis data that is associated with the web-page.

These objects and others are achieved by providing an integration between a path analysis system and a web-site navigation system. A user is provided a toolbar that is synchronized with a web-site navigation system, such as the Microsoft Internet Explorer or Netscape Navigator browser systems. The toolbar provides an interface to a path analysis system that provides path analysis data related to a select web-page. By synchronizing the toolbar to the browser, the path analysis system provides path analysis data related to the web-page that the browser is currently displaying. By displaying the path analysis data coincident with the content of the web-page from the browser, the user is provided a direct visual association between the actual web-page and the traversals to and from the web-page. By synchronizing the toolbar with the browser, the user can view the path analysis data of each page as the user navigates through the web-site using the same technology that a typical web-site visitor would use. The toolbar in a preferred embodiment is also configured to be synchronized to the movements of a cursor within the browser, and to highlight the path analysis data associated with each link as the cursor is brought in proximity to the link on the displayed web-page.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

This invention is presented herein using the paradigm of a path-analysis system having the capabilities of the aforementioned Netflame™ product from Fireclick, Inc. As will be evident to one of ordinary skill in the art, the principles of this invention are applicable to other web-site analysis systems and products.

Figure 1A:
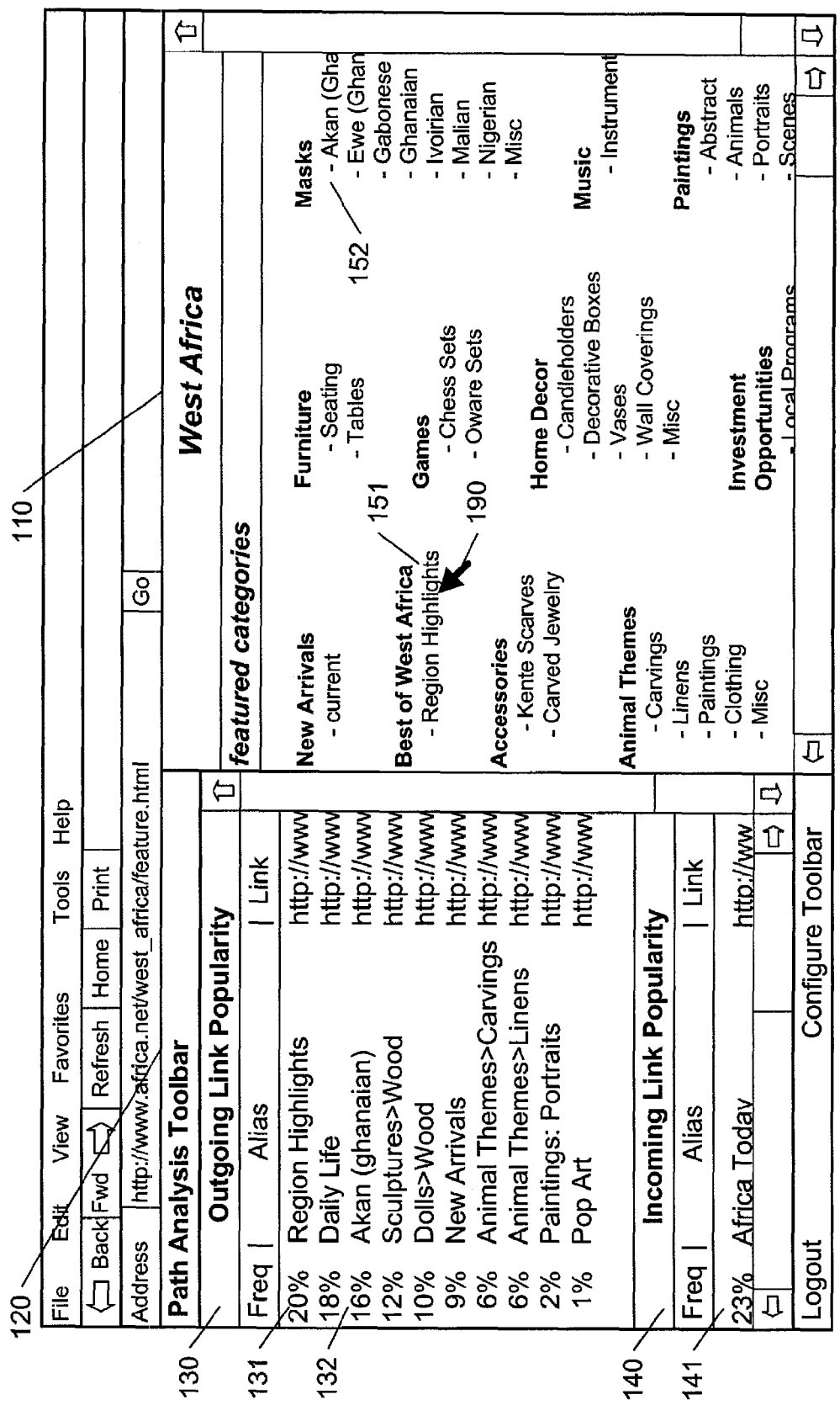
FIGS. 1A and 1B illustrate an example browser display of two web-pages of a web-site, and a coincident display of path analysis data related to the displayed web-page in accordance with this invention.
Figure 1B:
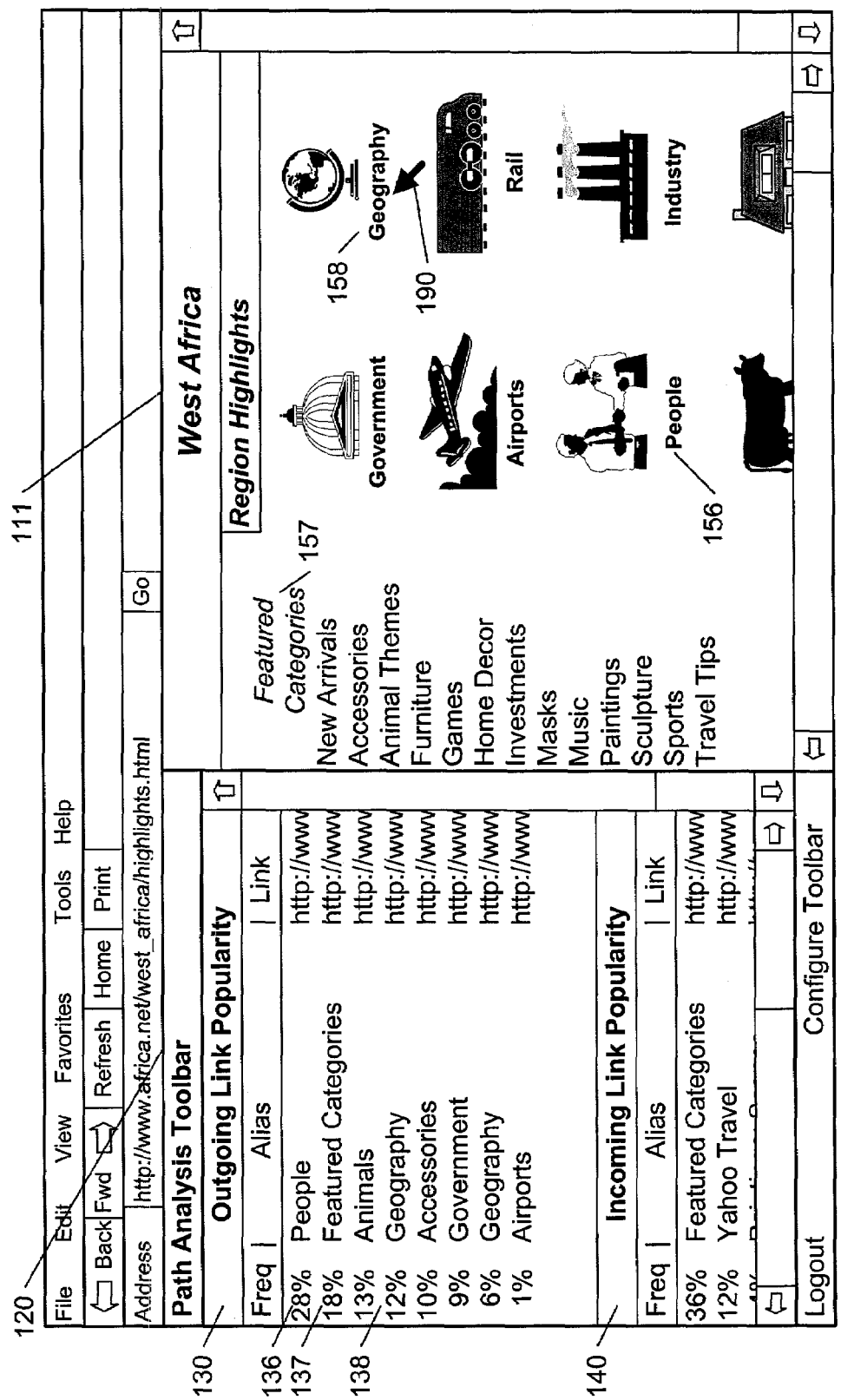

FIGS. 1A and 1B illustrate views of a display 100 that simultaneously contains the content of a web-page and path analysis data associated with the same web-page. As will be evident to one of ordinary skill in the art in view of this disclosure, any number of choices of location and format for this simultaneous display can be made, and the particular appearance of the display 100 in the figures is presented herein for illustrative purposes.

FIG. 1A illustrates an example browser display of a web-page 110. In accordance with this invention, a toolbar 120 is provided that is synchronized with the browser display. As the user navigates among pages of select web-sites, the path analysis data corresponding to the currently displayed page is displayed in the toolbar 120. In this manner, the user is provided a simultaneous view of the contents of the web-page and the path analysis data related to the web-page.

The simultaneous view of the path analysis data corresponding to the web-page while the browser displays the content of the web-page eases the task of retrieving path analysis data, and avoids the disassociation that is common when the user is presented path analysis data associated with a name of a web-page. In a conventional, non-simultaneous display of path analysis data, the user must remember, or imagine, the contents of the named web-page, or must refer to other sources to form the association. In the example of FIG. 1A, for example, the web-page 110 is titled "featured categories". In a conventional, non-simultaneous display of path analysis data, the display contains the name of the web-page, "featured categories", and the statistics related to traversals to and from the page. Generally, the user is expected to be able to associate the path-analysis data with the actual page, based on the name alone. If the user's recollection is poor, due perhaps to an infrequent need to assess the path analysis data, the user will generally refer to a collection of print-outs of the pages of the web-site, or may access the page via the Internet using a separate process, assuming that the name of the page that is used in reporting the path analysis data is consistent with a naming convention for the page on the web-site.

The display of the contents of web-page 110 in FIG. 1A illustrates a variety of categories ("New Arrivals", "Best of West Africa", "Accessories", etc.) and links to web-pages within these categories ("current", "Region Highlights" 151, "Kente Scarves", and so on).

In accordance with this invention, the toolbar 120 displays path analysis data corresponding to the web-page 110 that is currently displayed by the browser. In this example, the toolbar 120 displays the frequency of incoming 140 and outgoing 130 traversals to and from the displayed web-page 110, although other data related to the paths that visitors take to arrive at, or depart from, a web-page may be presented, as would be evident to one of ordinary skill in the art in view of this disclosure.

The invention is particularly well suited for the presentation of path-analysis data 130 related to the popularity of outgoing links from a web-page, because these links appear on the displayed web-page 110, thereby providing a visual association between the two. For example, the popularity entry 131 indicates that the link 151 to the "Region Highlights" web-page is the most frequently chosen page (20%) on the currently displayed "featured categories" web-page 110. That is, twenty percent of all visits to the "featured categories" web-page 110 result in the visitor selecting the "Region Highlights" link 151 on the web-page 110, causing a traversal to the "Region Highlights" web-page. In like manner, the "Akan (Ghanaian)" link 152 is illustrated, at 132, as being the third most popular exit point from the web-page 110, with sixteen percent of all visits terminating with a traversal to the "Akan (Ghanaian)" web-page.

By displaying the contents of the web-page 110 coincident with the path analysis data associated with the outgoing links 130, the user is provided an immediate visual association between the appearance of the links 151, 152 on the web-page 110 and the corresponding popularity 131, 132 of the links 151, 152. From this coincident display, the user may detect correlations or trends related to the location of the links on the web-page 110. For example, the user may observe that links that appear at the top of a web-page are generally more frequently selected than links at the bottom of the web-page, or links that are presented in particular colors or fonts are more frequently selected than links of other colors or fonts. In like manner, the location or visual characteristics of select links may be modified to support a particular marketing campaign, and the effectiveness of these modifications may be observed via a display of the path analysis data after the change to the content of the web-page are made. The coincident display of the web-page and the path analysis data also facilitates the documentation of the effectiveness of changes, via "before and after" printouts of the display 100.

Copending U.S. patent application, "DYNAMIC PATH ANALYSIS", Ser. No. 10/128,597, filed Apr. 22, 2002 discloses a path analysis system that allows a user to "filter" the collected data and/or the reported analysis information based on particular conditions, such as a time-frame of interest, characteristics associated with the visitor, how the visitor arrived at the site, and so on, and is incorporated by reference herein. Such filtering is often used to determine the effectiveness of a particular marketing strategy, or to evaluate the effects of changes made to the web-pages of a web-site. A preferred embodiment of this invention includes an embodiment of the filtering capabilities as taught in this copending application. Preferably, sets of filter conditions are saved as individual "campaigns", and the user is provided the option of selecting a particular campaign from among a list of current campaigns. Thereafter, the displayed path analysis data corresponds to data that satisfies the conditions of the selected campaign.

In a preferred embodiment, for completeness, the path-analysis toolbar 120 is also configured to display the path analysis data 140 associated with incoming traversals from other web-pages to the currently displayed web-page 110. As indicated at 141, twenty-three percent of all visits to the "featured categories" web-page 110 originate at the "Africa Today" web-page.

Also in a preferred embodiment of this invention, the path-analysis toolbar 120 contains links to other web pages, to facilitate, for example, a more detailed analysis, alternative analyses, and so on.

As noted above, the path analysis toolbar 120 is synchronized with the actions at the browser display of the web-page 110. As illustrated in FIG. 1A, a cursor 190 is placed in the vicinity of the link 151 to the "Region Highlights" web-page. When the user clicks on this link, the "Region Highlights" web-page is displayed by the browser, as illustrated in FIG. 1B.

FIG. 1B illustrates the display 100 of the "Region Highlights" web-page 111, and a coincident display of path analysis data 130, 140 associated with the web-page 111 in accordance with the principles of this invention. Because the path analysis toolbar 120 is synchronized to the selection of web-pages in the browser, the path analysis toolbar 120 automatically updates the displayed data 130, 140 to correspond to the web-page 111 that is currently displayed. As illustrated, at 136, the "People" link 156 is the most frequently selected link (28%) from the "Region Highlights" web-page 111. In addition to links to "lower level" pages to the displayed web-page, such as the "People" link 156, the example "Region Highlights" web-page 111 also contains links to select "higher level" or "peer" pages. For example, the aforementioned "featured categories" web-page (110 in FIG. 1A) is directly accessible from the "Region Highlights" web-page 111 via the link 157. As illustrated in the path analysis toolbar 120, traversals from the "Region Highlights" web-page 111 to the "featured categories" web-page (110 in FIG. 1A) via the link 157 is the second most frequent means of exiting the "Region Highlights" web-page 111. (In a preferred embodiment, the use of the "back" button on the browser after arriving at the web-page 111 from the web-page 110 is considered equivalent to explicitly selecting the link 157 to return to the web-page 110).

In accordance with another aspect of this invention, the synchronization of the path analysis toolbar 120 to actions on the displayed web-page 111 extends to movements of the cursor 190. When the cursor 190 is placed in the vicinity of a link, such as the link 158 as illustrated, the path analysis data entry 138, if any, is highlighted. In this manner, a user can rapidly assess the popularity of each link 156-158 of a web-page 111 by merely bringing the cursor 190 to the link of interest. In an alternative embodiment, to minimize processing time and complexity, the highlighting of the corresponding path analysis data entry is effected whenever the user clicks on the link using an "alternate mouse button", such as the "right button" on a two-button mouse that is configured to effect different selection actions, based on which button is pressed.

Figure 2:
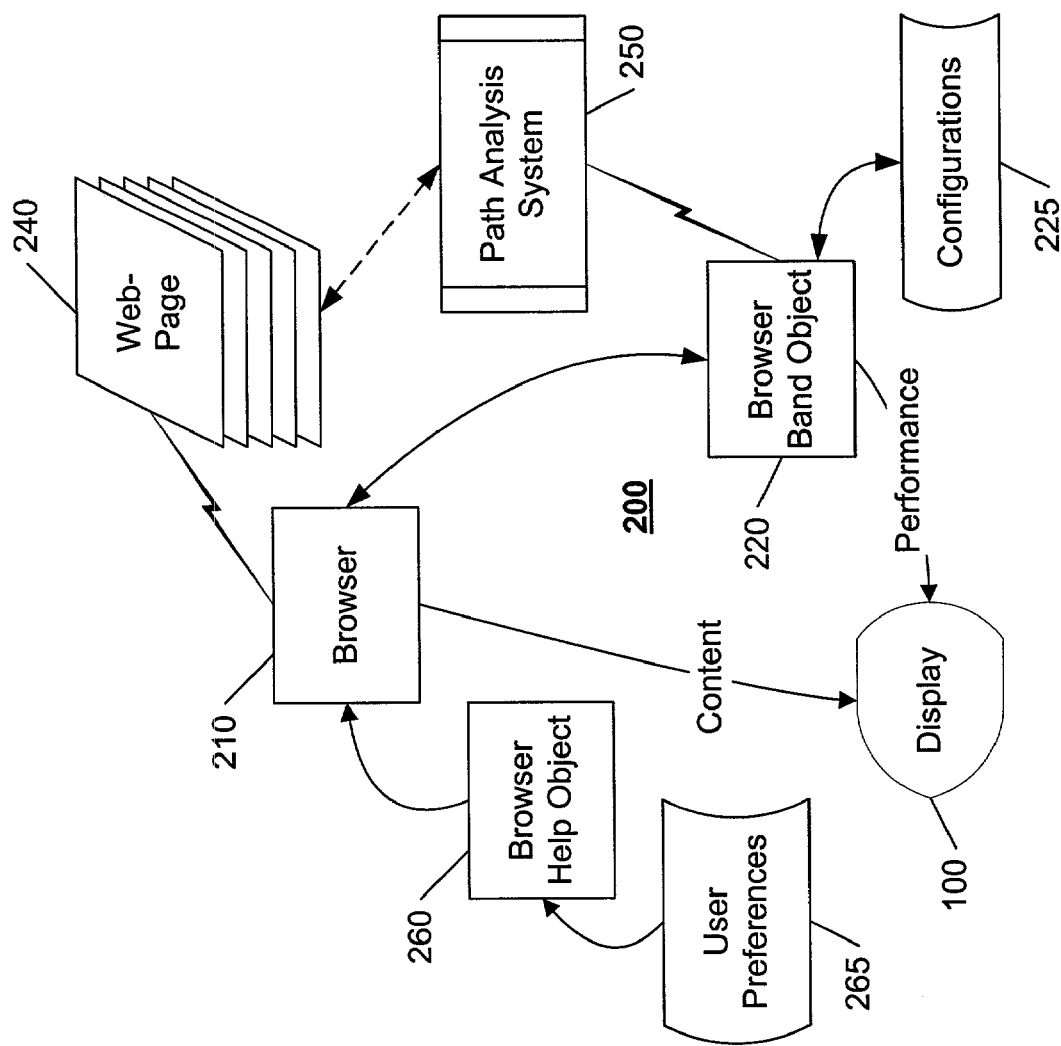
FIG. 2 illustrates an example block diagram of a web-site analysis system that provides a coincident display of path analysis data related to a web-page that is being displayed by a browser in accordance with this invention.

FIG. 2 illustrates an example block diagram of a web-site analysis system 200 that provides a coincident display of path analysis data related to a web-page 240 that is being displayed by a browser 210 in accordance with this invention. In a preferred embodiment of this invention, a "band object" 220 is used to synchronize the display of path analysis data with the display of the content (110, 111 of FIGS. 1A, 1B) of the web-page 240 by the browser 210. An icon is provided in the browser 210 for turning the band object 220 on and off.

As is known in the art, particularly with regard to the Microsoft Internet Explorer browser, a band object is a C++ COM dll that registers special keys in the registry to inform the browser that it is a band object. The browser is configured to display the name of the band object as a menu entry. When a user selects the band object from the menu, the browser invokes the band object via an entry to the C++ COM dll, and displays it. The user can subsequently hide the band object by closing it. A band object may host any windows control, and has programmatic access to the WebBrowser control of the main document being displayed by the browser, and can be configured to receive events from the main document.

In a preferred embodiment, the band object 220 is configured to display a WebBrowser control, which is a COM container for a web page, and is configured to receive events corresponding to the user clicking on a link within the main document. In this manner, the band object 220 is informed whenever the user selects a new page (110, 111 in FIGS. 1A, 1B) to be displayed by the browser 210, thereby providing synchronization with the browser 210. As noted above, the band object 220 may also be configured to effect alternative actions, such as the highlighting of select path analysis data, based on other events at the browser 210, such as a movement of the cursor (190 in FIGS. 1A, 1B), or the clicking of different buttons on the pointing device.

The band object 220 is configured to access data from a web-site path analysis system 250, such as the aforementioned Netflame™ analysis system. For the purposes of this disclosure, the path-analysis system 250 may correspond to multiple path-analysis systems, each providing information related to traversals among the web-pages of the web-site. Similarly, the path-analysis system 250 may include multiple alternative systems that provide similar or identical information. For example, many systems provide "mirror" sites that are configured to contain the same information as the original site, and are designed to provide access to the information if the original site is unavailable, or overloaded. As indicated by the dashed arrow, the analysis system 250 collects data regarding visits to select web-pages 240. A web-site provider subscribes to receive the services of the analysis system 250, and identifies the web-pages 240 of the web-site for which data is to be collected. Copending U.S. patent application, "DYNAMIC PATH ANALYSIS", Ser. No. 10/128,597, filed Apr. 22, 2002 discloses a path and performance analysis system that allows a user to filter the data related to visits to a web-site, to allow for targeted analysis periods, or to target visits to or from select sites or pages, and is incorporated by reference herein. In a preferred embodiment of this invention, the user is provided the option of predefining particular configurations 225 of the displayed path-analysis data, or storing the configuration of currently selected display options and formats for subsequent use.

Preferably, the analysis system 250 contains an application program that is configured to provide requested path analysis data, typically a DHTML/Javascript/Java applet application. Correspondingly, the band object 220 hosts a web page that contains program code, typically Javascript/Java code, that invokes the application at the analysis system 250 to extract the path analysis data from the analysis system 250 corresponding to the page (110, 111 in FIGS. 1A, 1B) that is currently being displayed by the browser 210. As noted above, the band object 220 receives event-notifications of user clicks from the browser 210, and is thus aware of each web-page selection via the browser 210. The program code at the band object 220 preferably writes the received path analysis data as DHTML content, for display within the window (120 in FIGS. 1A, 1B) associated with the band object 220.

Also illustrated in FIG. 2 is an optional browser helper object 260 that is configured to facilitate the implementation of user preferences 265.

In a typical browser environment, helper objects are always invoked when the browser is started, whereas a band object is invoked only if it had been invoked when the browser was last exited. Other default behavior may also be associated with the initiation of the browser.

To facilitate custom control of the analysis system 200, the browser helper object 260 of this invention access the user preferences 265 and subsequently issues commands to the browser 210 to effect these preferences 265, independent of the default behavior of the browser 210. For example, a user may prefer that the band object 220 is always invoked, or never invoked, when the browser 210 is started, independent of whether the band object 220 had been invoked when the browser 210 was last exited. Similarly, the user may prefer that the band object be invoked under certain circumstances, but not others. For example, the user may choose to invoke the band object 220 whenever the user is browsing an "analysis-enabled" web-site, or web-page, and to disable the band object 220 whenever the user traverses to another web-site.

As will be evident to one of ordinary skill in the art, the band object 220 of this invention is not limited to the presentation of path analysis information only. Copending U.S. patent application "WEB-PAGE PERFORMANCE TOOL-BAR", Ser. No. 10/128,595 discloses the display of performance data, such as the time required to download a web-page, coincident with a displayed web-page. As will be evident to one of ordinary skill in the art in view of this copending application and this disclosure, the band object 220 of this invention can be configured to include the presentation of performance data, as well as path analysis data, corresponding to the web-page that is displayed by the browser.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the use of a band object and helper object have been found to be particularly effective and efficient for embodying this invention, other techniques for synchronizing the behavior of a path analysis display object and a web page display object may be employed. A variety of system configuration and optimization features will be evident to one of ordinary skill in the art in view of this disclosure, and are included within the scope of the following claims.

I claim:

1. A web-page performance analysis system, comprising:
    a first display component that is configured to effect a display of contents of a particular web-page having outgoing links that facilitate traversals to other web-pages;
    an interface operatively configured to receive an input event from a user related to one of the outgoing links of the particular web-page when the particular web-page is displayed by the first display component; and
    a second display component that is configured to effect a display of path analysis data including information about traversals via one or more of the outgoing links simultaneously with the contents of the web-page and further configured to modify the display of select data of the path analysis data based on the received input event while the first display component maintains a display of the particular web-page.

2. The analysis system of claim 1 wherein the interface is configured to track placement of a cursor in the vicinity of one of the outgoing links of the particular web-page as the input event, and the second display component is configured to effect a display of path analysis data associated with at least one outgoing link in the web-page based on cursor placement in the vicinity of the link simultaneously with the contents of the particular web-page.

3. The analysis system of claim 1 wherein the path analysis data corresponds to one or more frequencies of the traversals.

4. The analysis system of claim 1 wherein the interface is configured to identify a user click on one of the outgoing links of the particular web-page as the input event, and the second display component is further configured to modify the display of select data of the path analysis data based on the user click on one of the outgoing links while the first display component maintains a display of the particular web-page.

5. The analysis system of claim 1 wherein incoming links facilitate traversals to the web-page from other web-pages, and the path analysis data is based upon traversals to the web-page via one or more of the incoming links.

6. The analysis system of claim 5 wherein the path analysis data corresponds to one or more frequencies of the traversals.

7. The analysis system of claim 5 wherein the interface is configured to receive an input event from a user related to one of the incoming links of the particular web-page when the particular web-page is displayed by the first display component, and the second display component is further configured to modify the display of select data of the path analysis data based on the input event related to one of the incoming links of the particular web-page while the first display component maintains a display of the particular web-page.

8. The analysis system of claim 1 wherein the second display component is configured to display the path analysis data based upon information received from a path analysis system.

9. The analysis system of claim 1 wherein the second display component is further configured to display performance data associated with the web-page, also in response to the selection of the web-page.

10. The analysis system of claim 1 further including a starter component that is configured to start the second display component based on a user-defined criteria.

11. The analysis system of claim 10, wherein the user-defined criteria includes at least one of:
    a commencement of the first display,
    a selection of the web-page, and a selection of a web-site associated with the web-page.

12. The analysis system of claim 10 wherein:
the first display component includes a browser,
the second display component includes a browser band object, and
the starter component includes a browser helper object.

13. The analysis system of claim 1 wherein:
the first display component includes a browser, and
the second display component includes a browser band object.

14. The analysis system of claim 1 further including a filter component that is configured to filter the path analysis data displayed by the second display component based on one or more user-defined conditions.

15. The analysis system of claim 14 wherein the one or more user-defined conditions include at least one of:
a time-frame,
a characteristic of visitors to the web-page, and
an origination of visits to the web-page.

16. A method of providing path analysis data associated with a particular web-page, including steps of:
displaying content of the particular web-page, by a first display component, having outgoing links that facilitate traversals to other web-pages;
receiving an input event via an interface from a user related to one of the outgoing links of the particular web-page when the particular web-page is displayed; and
displaying the path analysis data, by a second display component including information about traversals via one or more of the outgoing links simultaneously with the content of the web-page and modifying the display of select data of the path analysis data based on the received input event while continuing to display the particular web-page.

17. The method of claim 16 wherein the receiving step comprises tracking placement of a cursor in the vicinity of one of the outgoing links of the particular web-page as the input event, and wherein the displaying the path analysis data step includes displaying path analysis data associated with at least one of the outgoing links based on cursor placement in the vicinity of the link simultaneously with the content of the particular web-page.

18. The method of claim 16 wherein the path analysis data corresponds to one or more frequencies of the traversals.

19. The method of claim 16 wherein incoming links facilitate traversals to the web-page from other web-pages, and the path analysis data is based upon traversals to the web-page via one or more of the incoming links.

20. The method of claim 19 wherein the path analysis data corresponds to one or more frequencies of the traversals.

21. The method of claim 19 further including steps of:
receiving an input event from a user related to one of the incoming links of the particular web-page when the particular web-page is displayed, and
modifying the display of select data of the path analysis data based on the received input event related to one of the incoming links of the particular web-page while continuing to display the particular web-page.

22. The method of claim 16 further including receiving the path analysis data from a path analysis system.

23. The method of claim 16 further including displaying performance data associated with the web-page.

24. The method of claim 16 wherein the displaying the path analysis data step further includes filtering the path analysis data based on one or more user-defined conditions.

25. The method of claim 24 wherein the one or more user-defined conditions include at least one of:
a time-frame,
a characteristic of visitors to the web-page, and
an origination of visits to the web-page.

26. A method of providing a web-analysis service, including:
providing a path analysis display system that is configured to display path analysis data including information about traversals to other web-pages via at least one outgoing link in a particular web-page while contents of the particular web-page are displayed by a web-page display system, the path analysis display system further being configured to modify the display of select data of the path analysis data based on a received input event from a user related to the at least one outgoing link of the particular web-page when the particular web-page is displayed by the web-page display system.

27. The method of claim 26 wherein the path analysis display system is configured to display path analysis data associated with the at least one outgoing link based upon cursor placement in the vicinity of the link as the received input event.

28. The method of claim 26 wherein the path analysis data corresponds to one or more frequencies of the traversals.

29. The method of claim 26 wherein incoming links facilitate traversals to the web-page from other web-pages, and the path analysis data is based upon traversals to the web-page via one or more of the incoming links.

30. The method of claim 29 wherein the path analysis data corresponds to one or more frequencies of the traversals.

31. The method of claim 29 wherein the path analysis display system is further configured to:
receive an input event from a user related to one of the incoming links of the particular web-page when the particular web-page is displayed, and
modify the display of select data of the path analysis data, based on the received input event related to one of the incoming links of the particular web-page while continuing to display the particular web-page.

32. The method of claim 26 wherein the path analysis display system is further configured to receive the path analysis data from a path analysis system.

33. The method of claim 26 wherein the path analysis display system is further configured to display performance data associated with the web-page.

34. The method of claim 26 wherein the path analysis display system is further configured to filter the path analysis data displayed by the web-page display system based on one or more user-defined conditions.

35. The method of claim 34 wherein the one or more user-defined conditions include at least one of:
a time-frame,
a characteristic of visitors to the web-page, and
an origination of visits to the web-page.

36. The method of claim 26 wherein:
the web-page display system includes a browser, and
the path analysis display system includes a browser band object.

37. The method of claim 26 further including providing a path analysis system that is configured to collect information during accesses to the web-page, and to provide the path analysis data to the path analysis display system based on the information that is collected.

* * * * *